Figure 1:
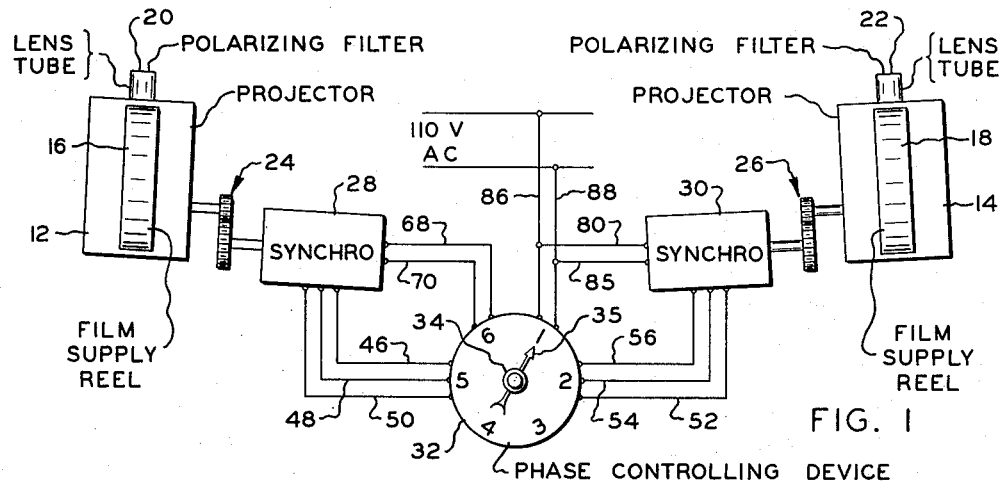

July 15, 1958

R. C. JONES 2,843,005

SYNCHRONOUS STEREOSCOPIC MOTION
PICTURE PROJECTION SYSTEM
Filed March 22, 1957

INVENTOR.
Robert C. Jones
BY
Brown and Mikulla
ATTORNEYS

United States Patent Office 2,843,005
Patented July 15, 1958

2,843,005

SYNCHRONOUS STEREOSCOPIC MOTION PICTURE PROJECTION SYSTEM

Robert C. Jones, Cambridge, Mass., assignor to Polaroid Corporation, Cambridge, Mass., a corporation of Delaware Application March 22, 1957, Serial No. 647,904

11 Claims. (Cl. 88—16.6)

The present invention relates generally to stereoscopic motion picture projection and more particularly to a system for synchronizing the projection of stereoscopic motion picture films.

This application is a continuation-in-part of my copending application Serial No. 384,736, filed October 7, 1953.

The presentation of stereoscopic or three-dimensional motion pictures involves the simultaneous projection of two pictures which are substantially identical in subject matter but which differ in perspective, it being required that the image intended for the left eye is seen only by the left eye of the viewer while the picture intended for the right eye is seen only by the right eye. The foregoing requirement has been met in a variety of ways, and one method involves the use of a pair of conventional motion picture projectors having light-polarizing filters. Each projector is provided with a light-polarizing element in optical alignment with its lens system and having its polarizing axis oriented at 90° to that of the other. Thus, by the use of proper analyzers, such as a pair of polarizing eyeglasses having as their lenses light polarizers, with polarizing axes at 90° to each other and parallel to the corresponding axes of the light-polarizing filters of the projectors, the images intended for the left and right eyes will be restricted thereto. Preferably, the polarizing axes of the projector filters and viewing glasses are at 45° to the vertical, the right- and left-eye axes, in each instance, being disposed at 90° to one another. Polarized light is reflected from a screen, having a suitable non-depolarizing surface, to the viewer without appreciable loss or alteration of polarization.

It will readily be appreciated that incorrect synchronization in the projection or stereoscopically related images adversely influences or substantially destroys the three-dimensional effect. At the very least, it is a source of discomfort and annoyance to the viewer such that it is important to remedy any such condition. Among principal causes of improper synchronization in the projection of stereoscopic pairs are errors made in editing and splicing the film, errors of alignment committed during threading of the films in the projectors, or the fact that the mechanisms of the projectors are so functioning, relatively, as to produce shutter and film-moving operations which are out of phase. Such faults will produce timing errors in the positioning of stereo pairs at the gates of the projectors amounting to fractions of a frame, or of one or more frames, and it is with the problem of correcting conditions of this nature that the present invention is particularly concerned.

It is, accordingly, a principal object of the present invention to provide a stereoscopic projection system comprising two motion picture projectors for the projection of a stereoscopic pair of motion picture films which includes simple and effective means for adjusting the relative position of stereo pairs of film at the respective projector gates, while both projectors are in operation. Another object is to provide a system of the character described in which adjustments of the relative position of the films are accomplished rapidly, imperceptibly and without placing excessive strain on projection and control apparatus. A further object is to provide novel control means comprising an electrical phase controlling device interposed between other synchronizing elements of the system and arranged to provide, when adjusted by an operator, predetermined angular displacements between said synchronizing elements resulting in synchronous projection of stereoscopic pairs of film. Still another object of the invention is to provide a system of the character described which is highly efficient for the purposes outlined but which is comparatively simple and inexpensive and which obviates the necessity of employing an expensive synchro differential or other costly apparatus.

Other objects of the invention will in part be obvious and will in part appear hereinafter.

The invention accordingly comprises the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

Figure 2:
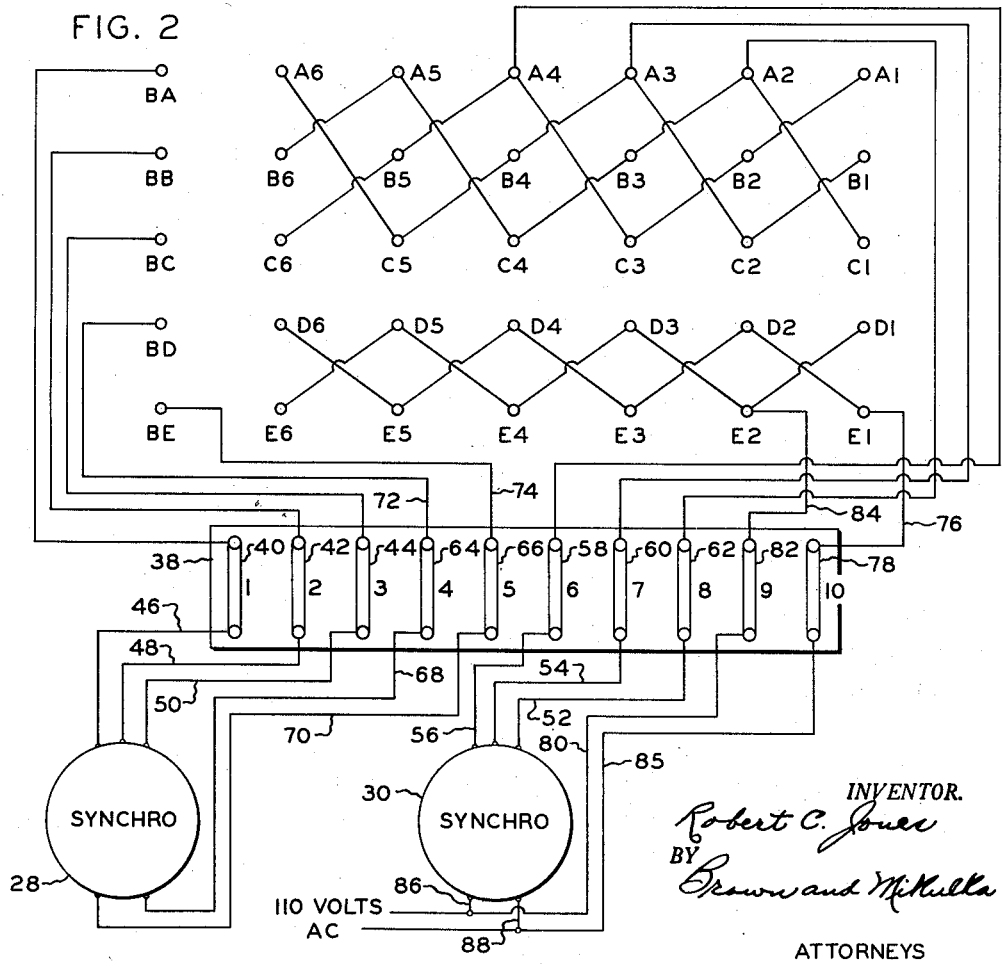

For a fuller understanding of the nature and objects of the invention, reference should be had to the following detailed description taken in connection with the accompanying drawing wherein:

Figure 1 is a diagrammatic representation of a stereoscopic motion picture projector control system illustrating a preferred form of the invention; and Fig. 2 is a wiring diagram relating to the phase controlling device of Figure 1.

Referring now to the drawing wherein like numerals relate to like parts there is shown a projection control system embodying the present invention. Two motion picture projectors 12 and 14 with converging optical axes, arranged, for stereoscopic projection, are shown in Figure 1, the projectors having film supplies 16 and 18, suitable drive and film-moving mechanisms of conventional design, and having polarizing filters 20 and 22 mounted in their respective lens tubes. Drive mechanisms of the projectors are connected by coupling means 24 and 26 to the rotors of a pair of synchros 28 and 30 of a conventional type as, for example, of the type defined in "Servomechanism Fundamentals," by Henri Laner, Robert Lesnick, and Lesley E. Matson, and published by Mc-Graw-Hill Book Co., Inc., 1947. The synchro 28 may, for clarity of explanation, be considered as a synchro generator and the synchro 30 as a synchro motor, although both synchros are preferably of similar construction. Each of the synchros comprises a rotor with a single phase winding and a stator having a 3-element, Y-connected field winding. Excitation of both synchros is from a single source of 110 volt, A. C. voltage. Each of the projectors 12 and 14 preferably has a standard type of drive mechanism including a drive motor, a rotary shutter, an intermittent movement, etc. (not shown). Couplings 24 and 26 may, for example, be connected to the projector drive motor shafts, in which instance they may comprise reduction gears, as shown, or other means to provide a given rotational movement of the synchros as, for example, to provide a rotational speed thereof of 1440 R. P. M. Where the projector drive motor or other utilized rotating part of the projector is turning at the desired speed, no reducing means will, of course, be employed. The rotational speed of synchros 28 and 30, as driven by drive mechanism of the projectors and couplings 24 and 26, necessarily has a given relation to film movement in the projectors and more particularly to the frequency at which frames of film are positioned for projection at the gates of the projectors. It is to be assumed, for example, that the projectors operate at the standard speed of 24 frames per second for sound film, and for purposes of illustration, that one frame of film is positioned at the gate of each projector during one revolution of shafts 24 and 26 which would involve the aforesaid rotation of the synchro rotors at 1440 R. P. M. The phase controlling device 32, in cooperation with synchros 28 and 30 and couplings 24 and 26 between the latter and drive mechanisms of the projectors 12 and 14, provide a system for correcting relative misalignment of frames of films, or fractions thereof, at the gate of either projector through the establishment of various controlled relative angular displacements of the rotors of the synchros. Phase controlling means 32 is preferably in the form of a 5 deck, 5 pole, 6 position-per-pole rotary switching means for providing a novel manual control of the phase relationships of synchros 28 and 30. Thus, for example, by rotating the movable contact mechanism of the phase controlling means 32, the angular position of the rotor of synchro 30 can be relatively advanced or retarded sufficiently to cause the mechanism of projector 14 to be advanced or retarded relative to that of projector 12. This, in turn, provides a relative advance or retardation of a predetermined fraction of a frame of film in a selected projector such that both frames of the stereoscopic pair are projected simultaneously.

The six positions of the phase controlling device 32 are arranged to provide indices 60° apart. Upon rotating knob 34 the movable contacts of the device are moved into contacting relation with the fixed contacts and are preferably held at each position by suitable detent means (not shown). The shaft bearing the movable contacts is capable of infinite rotation in either direction so that more than one revolution of the pointer is possible. The stationary contacts are so dimensioned and spaced that a given circuit or circuits are broken before an additional circuit or circuits can be closed to provide a break-before-make type of operation. For the load requirements contemplated, the device 32 is preferably constructed to accommodate a surge of current of at least 6 to 8 amperes, although the normal operating load may be as little as 2 amperes. As employed in the present circuitry, the device 32 is used with a 110–120 volt, 60 cycle, single-phase A. C. supply.

Phase controlling device 32 comprises five decks or gangs, each deck having six fixed contacts which are arranged to be engaged successively by one of the cooperating movable contacts BA, BB, BC, BD and BE associated with that particular deck and mounted on the rotatable portions of the device. As shown in Fig. 2, the decks are indicated by the letters A, B, C, D and E, and the fixed contacts thereof are numbered 1 to 6 in each deck and preferably correspond to the indices 1 to 6 on the dial of the device. The fixed contacts of A deck, cooperating with movable contact BA, comprise contacts A1, A2, A3, A4, A5 and A6. Similarly, the decks B, C, D and E, having a like number and arrangement of fixed contacts, cooperate with movable contacts BB, BC, BD and BE, respectively. It will be noted that fixed contact A6 is directly connected to fixed contacts C5, B4, A3, C2 and B1; that fixed contact B6 is directly connected to fixed contacts A5, C4, B3, A2 and C1; and that fixed contact C6 is directly connected to fixed contacts B5, A4, C3, B2 and A1. The movable contacts BA, BB and BC are connected, as shown in Fig. 2, through terminal strip 38, having terminals 40, 42 and 44 to leads 46, 48 and 50 from the field winding of synchro 28. Synchro 30 has its field-winding leads 52, 54 and 56 connected through terminals 62, 60 and 58 to contacts A2, A3 and A4, respectively. It is further to be noted that movable contacts BD and BE are connected through terminals 64 and 66 and leads 68 and 70 to the rotor terminals of synchro 28 and the rotor terminals of synchro 30 are connected to given sides of the 110 volt A. C. line by leads 86 and 88 and to fixed contacts E1 and E2 through leads 66 and 84, terminals 78 and 82 and leads 85 and 80, respectively. The aforesaid arrangement provides various possible interconnections of the field and rotor windings of the synchros 28 and 30 to effect the changes of phase relation required by the invention.

When knob 34 is turned to position pointer 35 of the phase controlling device at the number 6 position, the movable contacts BA, BB and BC are in contact with the stationary contacts A6, B6 and C6 and the field-winding leads 46, 48 and 50 of synchro 28 are connected with the field-winding leads 56, 54 and 52, respectively, of synchro 30. Likewise, movable contacts BD and BE are in contact with fixed contacts D6 and E6, respectively, which connect the rotor terminals of synchro 28 to the same sides of the 110 volt. A. C. line as are the rotor terminals of synchro 30. This provides an interconnection of the corresponding field-winding and rotor terminals of both synchros such that the three alternating output voltages of synchro 28, having given phase polarities and given voltage peak values according to the angular position of its rotor, produce a similar angular position of the rotor of synchro 30. The aforesaid arrangement and operation, with the switch pointer 35 at index 6, is substantially conventional and as long as the synchro elements are connected in such a manner, both synchro rotors turn in unison. When, however, the stereoscopic frames are positioned in the projectors so that they are not projected synchronously and, for example, it is found necessary to advance, relatively, the film moving mechanism of the projector 14, switch knob 34 is turned in a counterclockwise direction so that pointer 35 is at index 5, thus bringing the movable contacts BA, BB and BC into closed relation with contacts A5, B5 and C5. The field-winding leads 46, 48 and 50 of synchro 28 will then be connected to the field-winding leads 52, 56 and 54, respectively, of the synchro 30.

This operation alone would provide an alteration of the relative phase polarities of the synchros such that the rotor of synchro 30 would, in view of the Y-connected arrangement of the field windings of the synchros, be impelled to rotate 120° in a reverse direction, or to apply a braking force equivalent thereto, if no other phase modification were introduced. Such an operation, of course, would not be in accord with the desired relative advance of the film moving mechanism of projector 14. However, when the pointer 35 of phase controlling means 32 is moved to index 5, movable contacts BD and BE are also simultaneously brought into contact with fixed contacts D5 and E5, respectively. The rotor terminals of synchro 28 are thereby connected to sides of the 110 volt A. C. line opposite to those to which corresponding rotor terminals of synchro 30 are connected, thus reversing the phase polarity of current passing through the rotor of synchro 28 and influencing the rotor of synchro 30 to advance 180° or, otherwise expressed, to apply an accelerating force equivalent thereto. Intermediate connections providing the aforesaid reverse connection of rotor terminals of synchro 28 to the 110 volt A. C. line are as follows:

The rotor terminals of synchro 28 are connected through leads 68 and 70, terminals 64 and 66 and leads 72 and 74 to movable contacts BD and BE, respectively. Engagement of the movable contacts BD and BE with fixed contacts D5 and E5, respectively, completes the circuit through the network of interconnecting fixed contacts, as shown, and through leads 84 and 76, terminals 82 and 78 and leads 80 and 85.

From the foregoing explanation and tracing of circuits it will be understood that the simultaneous production of unbalanced voltage in the stator windings and a reversal of polarity in the rotor winding provides a net relative forward angular displacement or rotational step of 60° of the rotor of synchro 30 which is the algebraic sum of the angular displacements in opposite directions and which, by applying an accelerating force to the mechanism of projector 14 and a braking force to the mechanism of projector 12, produces a relative advance of one-sixth of a frame of film in projector 14. The aforesaid relative positional change of 60° of the rotor and the accompanying relative advance of one-sixth of a frame of film in terms of timing, are typical of the results which are desired in conjunction with the positioning of the pointer 35 at each of the six indices of the phase controlling device. Accordingly, movement of the pointer through the six indices provides a cumulative relative advance of one revolution of the rotor of synchro 30 and its associated projector mechanism and an adjustment in the relative positioning of the films at the projector gate which is equivalent to one frame. While the aforesaid operations have been described with respect to advancement of film in projector 14, it will be understood that by turning the knob 34 in a direction opposite to that above-described, the timing of a given frame, or fraction thereof of a steroscopic pair in projector 14 may be retarded instead of advanced with respect to related film portions in projector 12. The aforesaid steps of relative angular displacement of 60° each provide the "fine" adjustments desired and, moreover, they have the distinct advantage of not placing an excessive momentary strain on the synchro and projector mechanisms involved, which would be the case if a single step involved a large relative angular displacement. If a relative misalignment in excess of one frame exists so that one complete revolution of pointer 35 is insufficient to produce the correctional relative displacement of a given film required, it is to be understood that a sceond, a third, etc. rotation of the device is to be performed, as may be necessary.

As will be apparent, certain modifications in the design and construction of the phase controlling device 32 may be made within the scope of the invention to achieve changes of phase polarities through the simultaneous alteration of stator terminal connections and line connections of a synchro unit of the system. Thus, for example, the device 32 could have a lesser number of decks, additional fixed contacts mounted thereon, and two or more movable contact arms operating with respect to the fixed contacts of each deck.

While the present invention has been described particularly with respect to the synchronous operation of motion picture projectors, it will be understood that the system may also have utility with respect to other applications wherein the synchros are driven by mechanisms in which changes in the relative position of elements of the mechanisms are desired. In such applications, for example, additional elements of the types shown could be incorporated therewith.

Since certain changes may be made in the above apparatus and process without departing from the scope of the invention herein involved, it is intended that all matter contained in the above description or shown in the accompanying drawing shall be interpreted as illustrative and not in a limiting sense.

What is claimed is:

1. In combination with a pair of motion picture projectors adapted to the stereoscopic projection of motion picture films in which said films are moved by mechanisms of the projectors at substantially identical speeds, a system for providing relative phase corrections of film-moving mechanisms of said projectors and the synchronous positioning of related areas of said films for projection purposes, said system comprising a pair of synchros, each including a three-element, Y-connected stator winding and a single-phase rotor winding, individual coupling means connecting one of said synchros with the drive mechanism of one projector and the second synchro with the drive mechanism of the second projector, said coupling means cooperating with the drive and film-moving mechanisms of the projectors to provide one revolution of the synchro rotors for each positioning of the frames of said films for projection, and manually adjustable phase controlling means electrically connected to the respective stator and at least in part to the rotor windings of said synchros for predeterminedly varying the relative electrical phase thereof to provide a plurality of given relative angular displacements of the rotors of said synchros and thereby to vary the relative phase of said projector mechanisms and the relative position of stereo frames of said films for projection, said phase controlling means comprising a plurality of fixed and movable contacts, actuating means for moving said movable contacts into closed and open relation with said fixed contacts and indicating means comprising movable and fixed indices for indicating, respectively, the relative location of said movable and fixed contacts, the relative angular displacement of the synchro rotors and the relative position of the stereo frames, said phase controlling means providing different electrical connections between the stator windings of the two synchros and a reversal of the rotor connections of a given one of the synchros to the two sides of a single phase alternating current line for each setting of said movable and fixed indices.

2. A system according to claim 1 wherein the film speeds are 24 frames per second, the synchro rotors are rotated by the projector mechanisms at 1440 R. P. M., and movement of the movable index to each fixed index of the phase controlling means alters the relative angular displacement of the synchro rotors by 60° and the relative position of the films in the projectors by one-sixth of a frame.

3. A system according to claim 1 wherein the rotor winding of that one of said synchros which does not undergo a reversal of its line connections is permanently connected to given sides of the single phase alternating current line.

4. A system according to claim 1 wherein said phase controlling means includes a rotatable shaft bearing five movable contacts, a knob for turning the shaft and having a pointer for indicating given angular positions thereof, six fixed indices adapted to be indicated by the pointer and six decks, each having six fixed contacts mounted thereon.

5. A system according to claim 1 which is adapted to the accurate projection, registration and viewing of stereoscopic images in polarized light wherein each of said projectors includes a light-polarizing element having a given polarizing orientation optically aligned with its lens system and wherein said images are adapted to be viewed by analyzing means also having given polarizing orientations which are related to those of said elements.

6. A system according to claim 1 wherein movable adjustment means of said phase controlling means are operable during continuous rotation of said synchro rotors by drive means of said projectors.

7. A system according to claim 1 wherein closing of the movable contacts of the phase controlling means with the first of the fixed contacts provides an interconnection of similar terminals of the stator windings of both synchros and a connection of similar terminals of the rotor windings to the same sides of the alternating current line, and closing of the movable contacts with other of the fixed contacts provides an interconnection of dissimilar terminals of the stator windings and alternate reversals of the connections of the winding of one of the rotors to said alternating current line.

8. A system according to claim 1 wherein the phase controlling means comprises six fixed indices arranged at 60-degree intervals and positioning of the movable index at each of said fixed indices produces relative angular displacements of the synchro rotors in 60-degree steps.

9. A system according to claim 8 wherein location of the movable index at any one of the six fixed indices numbered 2 through 6 provides a phase relationship between the synchro output voltages and the exciting voltage such that the two synchros operate in phase electrically but with their rotors relatively angularly displaced by given amounts for each location.

10. A system according to claim 8 wherein each of said 60-degree steps of relative angular displacement is the algebraic sum of electrically produced phase differences between the synchros which tend to provide, simultaneously, a 120° relative angular displacement of the synchro rotors in one direction and a 160° relative angular displacement of said rotors in an opposite direction, said displacements and directions thereof being provided so as to cause a relative advance of a given projector mechanism in accordance with the direction in which said movable index is moved.

11. A stereoscopic motion picture system incorporating means permitting corrections for out-of-phase operation of a plurality of motion picture projectors of said system, said system comprising two projectors each adapted to operate at a given speed and to project frames of motion picture film which together constitute a continuity of stereo pairs, two synchros each comprising a three-element stator winding and a rotor winding, a phase controlling device for permitting a control of the phase relation of said synchros, means mechanically coupling a first of said projectors with a first of said synchros and the second of said projectors with the second of said synchros, means electrically connecting the three-element stator windings of both synchros and the rotor winding of said first synchro with said phase controlling device and the rotor winding of said second synchro to given sides of a supply of alternating line voltage, said phase controlling device comprising a plurality of manually controlled movable and fixed circuit closing means and indices relating thereto for providing a variety of interconnections between the stator windings of said first and second synchros and, simultaneously therewith, a succession of reverse connections of the stator winding of said first synchro to the sides of said supply of alternating line voltage.

References Cited in the file of this patent

UNITED STATES PATENTS

| | | |
|---|---|---|
| 1,435,520 | Hammond | Nov. 14, 1922 |
| 1,465,087 | Merrill | Aug. 14, 1923 |
| 2,198,815 | Haskin | Apr. 30, 1940 |
| 2,394,361 | Bruderlin | Feb. 5, 1946 |
| 2,482,020 | Meagher et al. | Sept. 13, 1947 |
| 2,648,252 | Stancliff et al. | Aug. 11, 1953 |
| 2,652,523 | McCartney et al. | Sept. 15, 1953 |
| 2,711,668 | Dresser | June 28, 1955 |

FOREIGN PATENTS

| | | |
|---|---|---|
| 247,240 | Great Britain | Feb. 12, 1926 |
| 921,769 | France | May 19, 1947 |
| 680,929 | Great Britain | Oct. 15, 1952 |